(12) United States Patent
Heil (10) Patent No.: US 7,258,436 B2
(45) Date of Patent: Aug. 21, 2007

(54) PERSONAL VISION FIELD BLOCKER

(76) Inventor: Arlan Dean Heil, 16411 Creeksouth Rd., Houston, TX (US) 77068

( * ) Notice: Subject to any disclaimer, the term of this patent is extended or adjusted under 35 U.S.C. 154(b) by 0 days.

(21) Appl. No.: 11/296,576

(22) Filed: Dec. 7, 2005

(65) Prior Publication Data

US 2006/0158609 A1    Jul. 20, 2006

Related U.S. Application Data

(60) Provisional application No. 60/639,840, filed on Dec. 28, 2004.

(51) Int. Cl.
*G02C 3/00* (2006.01)

(52) U.S. Cl. .............. 351/155; 351/158; 2/10
(58) Field of Classification Search ............... 351/41, 351/44, 155, 156, 158; 2/9–13, 15
See application file for complete search history.

(56) References Cited

U.S. PATENT DOCUMENTS

| | | | |
|---|---|---|---|
| 873,856 A | 12/1907 | Gordon | |
| 2,456,334 A | 12/1948 | Shindel | |
| 2,462,258 A | 2/1949 | Dannenberg | 2/10 |
| 4,549,793 A * | 10/1985 | Yoon | 351/156 |
| 4,837,862 A * | 6/1989 | Heil | 2/12 |
| D306,739 S | 3/1990 | Mackiewich | D16/129 |
| 4,955,087 A | 9/1990 | Perez et al. | 2/12 |
| 4,986,649 A | 1/1991 | Smith | 351/130 |
| 5,046,195 A | 9/1991 | Koritan | 2/172 |
| D347,723 S | 6/1994 | Navis | D2/871 |
| 5,347,655 A * | 9/1994 | Garrett | 2/10 |
| 5,448,778 A | 9/1995 | Phillips | 2/172 |
| 5,481,750 A | 1/1996 | Parise et al. | 2/195.1 |
| 5,544,361 A * | 8/1996 | Fine et al. | 2/10 |
| 5,581,807 A | 12/1996 | Peterson | 2/10 |
| 5,615,414 A | 4/1997 | Landis | 2/12 |
| 5,647,061 A * | 7/1997 | Marcus | 2/11 |
| 5,769,290 A | 6/1998 | Pestana | 224/178 |
| 5,815,831 A | 10/1998 | DeWan | 2/10 |
| D403,294 S | 12/1998 | Baldwin et al. | D12/417 |
| 5,924,129 A | 7/1999 | Gill | 2/10 |
| 6,237,147 B1 | 5/2001 | Brockman | 2/10 |
| D489,393 S | 5/2004 | Hester | D16/316 |
| 6,789,271 B2 | 9/2004 | Banks | 2/426 |

* cited by examiner

*Primary Examiner*—Huy Mai
(74) *Attorney, Agent, or Firm*—Guy McClung (57) ABSTRACT

A blocking apparatus for positioning in front of a person's face, the apparatus in certain aspects having a front member disposable in front of a person's face, the front member having two spaced-apart ends, two tab members, each tab member projecting from one of the two spaced-apart ends of the front member, each tab member disposable at an angle to the front member and each tab member permanently attachable to another item or, in certain aspects, the front member releasably attachable to another item, and the front member sized and shaped for blocking, e.g. snow, rain, moisture and/or light on a portion of a person's face and/or eyes.

20 Claims, 5 Drawing Sheets

PERSONAL VISION FIELD BLOCKER

RELATED APPLICATION

This is application claims priority from U.S. application Ser. No. 60/639,840 filed Dec. 28, 2004, which prior application is incorporated fully herein for all purposes.

BACKGROUND OF THE INVENTION

1. Field of the Invention

This invention is directed to apparatus for selectively blocking light, moisture, glare and/or sunlight in a person's vision field, on a person's face and/or on a person's eyes.

2. Description of Related Art

The prior art discloses a wide variety of sunshades, headgear, headbands, hats, eyeshades, visors, and caps.

There has long been a need for apparatus that effectively partially blocks part of a person's field of vision. There has long been a need for an apparatus to block light, etc. on a person's eyes.

SUMMARY OF THE PRESENT INVENTION

The present invention, in one embodiment, discloses apparatus for use with a headband, visor, hat, sunshade, headgear, or cap which has a blocking member that is positioned in front of a person's face, e.g. in front of a person's eyes. The blocking member blocks a portion of the person's field of vision and, in certain aspects, shades a person's eyes. The blocking member, in certain aspects, is releasably or permanently connectable to a head band or to part of an eyeshade, headgear, visor, headband, hat or cap. In certain aspects the blocking member is opaque; but in other aspects it is transparent and/or tinted (which are not equivalents of an opaque blocking member).

The present invention, in certain aspects, discloses a blocking apparatus for positioning in front of a person's face, the blocking apparatus including a front member disposable in front of a person's face, the front member having two spaced-apart ends, two tab members, each tab member connected to or formed integrally of and projecting from one of the two spaced-apart ends of the front member, each tab member disposable at an angle to the front member and each tab member having means thereon for attachment of the front member to another item, and the front member sized and shaped for blocking a portion of a person's face.

In certain embodiments, the present invention discloses: a support for supporting eye glasses worn by a person. In one aspect such a support is used with a headgear, headband, cap, eyeshade, hat, or visor and has a connector connected to the headband, cap, etc. and a support extension from the connector. The support extension engages part of a person's eyeglasses to support them. In one aspect such a support is used with a blocking device according to the present invention. In certain aspects, a member according to the present invention can also block rain or snow.

The present invention, in certain aspects, discloses an eyeglasses support for supporting eyeglasses and/or for inhibiting release of eyeglasses from a position on a person's head, the eyeglasses support including, in certain aspects, an eyeglasses support with a base securable to another item, e.g. to part of a cap and a support member extending down from the base, and the support member having an upturned end for engaging part of a person's eyeglasses to inhibit release of the eyeglasses from the person's head.

It is, therefore, an object of at least certain preferred embodiments of the present invention to provide:

New, useful, unique, efficient, nonobvious apparatuses for blocking part of a person's face and/or eyes;

Such apparatus which is selectively positionable and/or releasably connected to a headgear, visor, eyeshade, headband, cap or hat;

Such apparatus which is usable in conjunction with an eyeglasses support according to the present invention; and Such apparatus which is easily connected to and disconnectible from a visor, etc.

New, useful, unique, efficient, nonobvious eyeglasses supports.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's, realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

The Abstract that is part hereof is to enable the U.S. Patent and Trademark Office and the public generally, and scientists, engineers, researchers, and practitioners in the art who are not familiar with patent terms or legal terms of phraseology to determine quickly from a cursory inspection or review the nature and general area of the disclosure of this invention. The Abstract is neither intended to define the invention, which is done by the claims, nor is it intended to be limiting of the scope of the invention in any way.

It will be understood that the various embodiments of the present invention may include one, some, or all of the disclosed, described, and/or enumerated improvements and/or technical advantages and/or elements in claims to this invention.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

DESCRIPTION OF EMBODIMENTS
PREFERRED AT THE TIME OF FILING FOR
THIS PATENT

Figure 1A:
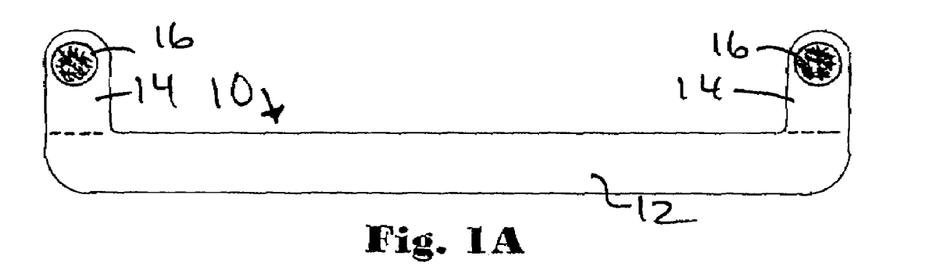
FIG. 1A is a front view of an apparatus according to the present invention.
Figure 1B:
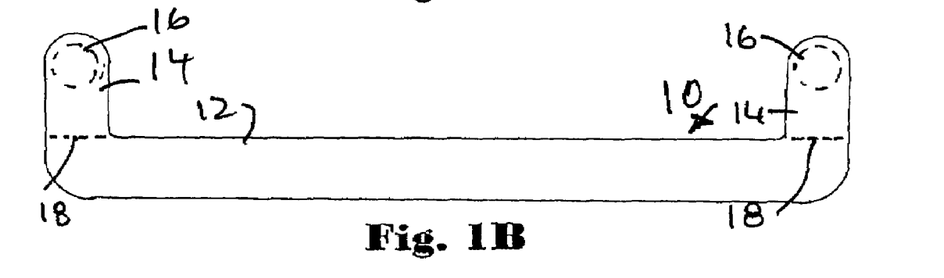
FIG. 1B is a rear view of the apparatus of FIG. 1A.

FIGS. 1A and 1B show an apparatus 10 according to the present invention with a front member 12 which is locateable in front of a person's face to block part of the person's face, e.g., but not limited to, to block sunlight from a persons' eyes and/or to provide blocking of a portion of the person's field of vision. At each end of the front member 12 is a tab 14 extending at an angle to the front member 12 (as shown this angle is a right angle, but it is within the scope of this invention for this angle to be any suitable angle). The front member 12 as shown is opaque, but it is within the scope of the present invention for it to be transparent and/or tinted and/or to be of any known material used for lenses of sunglasses.

Each tab 14, optionally, has attachment apparatus 16, e.g. releasably cooperating hook-and-loop fastener material ("RCHLF" material) [e.g. VELCRO (™) material] or adhesive material for attaching the apparatus 10 to another item on a person's head, e.g., but not limited to, a headgear, cap, visor, eyeshade, hat, headband or sunshade. Optionally, a crease 18 is provided between each tab 14 and the front member 12 to facilitate bending of the front member 12 with respect to the tabs 14 for selective positioning of the front member 12 with respect to a person's eyes or face.

The apparatus 10 may be made of any suitable material, e.g., but not limited to paperboard, cardboard, or plastic, which is flexible and sufficiently rigid to hold its shape when in use. In certain aspects, the front member (e.g. the front member 12) is opaque (or transparent and/or tinted) and/or a projection member (e.g. the projection member 34 described below) is opaque (or transparent and/or tinted) and an adjacent front member is transparent [e.g. the front member 32, FIG. 3A; or a portion (or portions) of a front member is opaque and a portion or portions is transparent].

Figures 2A, 2B, 2C:
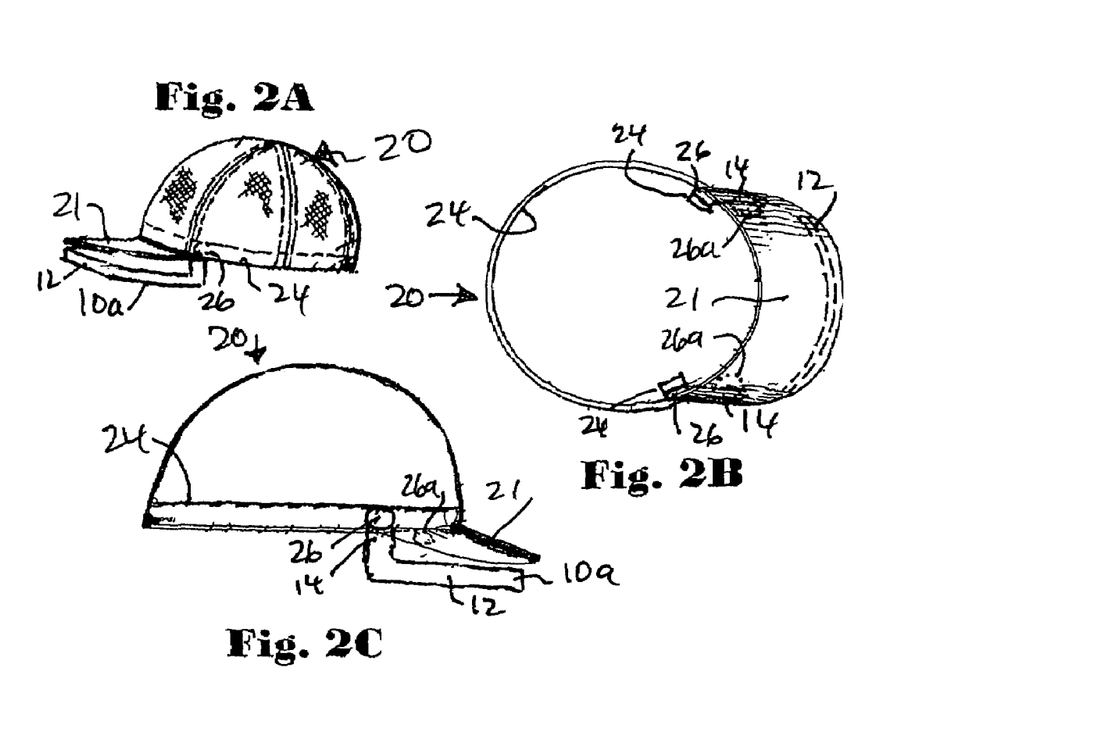
FIG. 2A is a perspective view of a cap according to the present invention.
FIG. 2B is a top view, partially in cross-section of a cap according to the present invention.
FIG. 2C is a side cross-section view of the cap of FIG. 2A.

FIGS. 2A-2C show a cap 20 with an apparatus 10a (like the apparatus 10; like numerals indicate like parts). Attachment apparatuses 16 made of RCHLF material are releasably attached to corresponding amounts 26 of RCHLF material 22 on a band 24 of the cap 20. Optionally, corresponding amounts 26a of RCHLF material are on an underside or a bill 21 of the cap 20 for releasable attachment of the apparatus 10a to the bill 21.

Figure 3A:
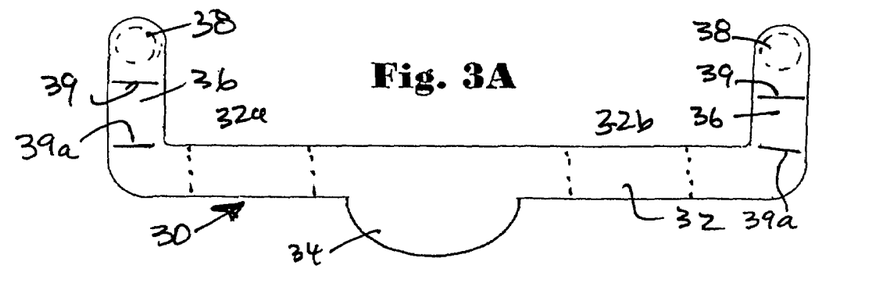
FIG. 3A is a front view of an apparatus according to the present invention.

FIG. 3A shows an apparatus 30 according to the present invention which has a front member 32 with a projecting member 34. Optionally the front member 32 is transparent and the projection member 34 is opaque (or transparent and/or tinted); or the front member 32 and the projection member 34 are opaque (or transparent and/or tinted); or portions 32a, 32b are transparent and the remaining portions of the front member 32 and the projection member are opaque.

Tabs 36 extend at an angle from the front member 32 and have attachment apparatus 38 (like the attachment apparatus 16, FIG. 1A). Optionally, a crease or indentation 39 in each tab 36 facilitates bending of the apparatus at the crease 39. Optionally, creases or indentations 39a provide an alternate fold location for folding ends of apparatus 30, e.g. to accommodate a transition between a cap's main body and its visor or bill.

Figure 3B:
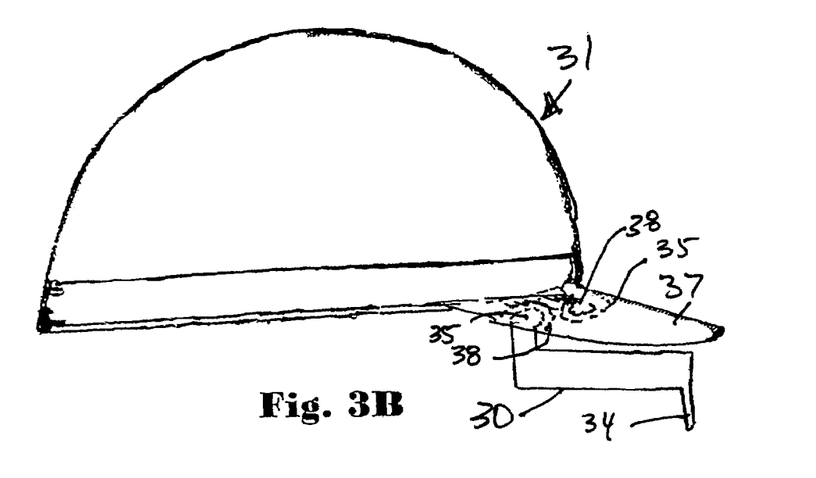
FIG. 3B is a side view of a cap according to the present invention with an apparatus as in FIG. 3A.

FIG. 3B shows a cap 31 according to the present invention with an apparatus 30 releasably attached thereto (although, as is the case for every embodiment of the present invention, the apparatus may be permanently attached to a cap, etc., with rivets and/or sewing). The attachment apparatuses 38, in this aspect made of RCHLF material, are releasably mated with corresponding amounts 35 of RCHLF material on and underneath a bill 37 of the cap 31. Optionally, snap apparatus, pins, or safety pins may be used (as is the case for any embodiment herein).

Figures 4A, 4B, 4C:
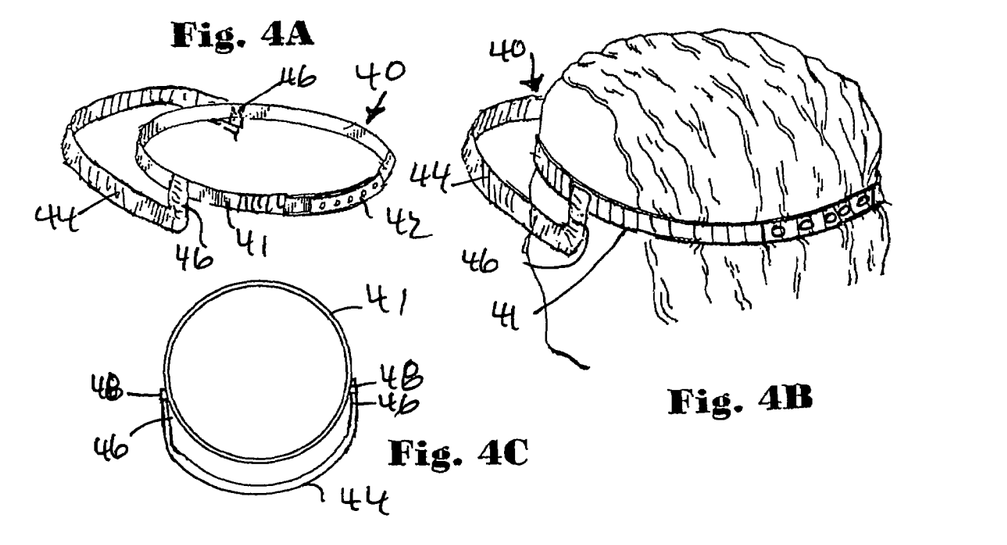
FIG. 4A is a perspective view of an apparatus according to the present invention.
FIG. 4B is a perspective view of an apparatus according to the present invention as in FIG. 4A on a person's head.
FIG. 4C is a top view of the apparatus of FIG. 4A.

FIGS. 4A-4C show an apparatus 40 according to the present invention which has an adjustable headband 41 with a well known length adjustable apparatus 42 (e.g. hole-projection adjustability device; holes on one end, projections on a corresponding end; belt/buckle apparatus also usable for this; and/or RCHLF material adjuster). An apparatus 43 has a front member 44 and tabs 46 (like the tabs 16, FIG. 1A and tabs 36, FIG. 3A) which are releasably connected with attachment apparatuses 48 to the headband 41. The front member 44 is positioned in front of a person P's eyes (FIG. 4B).

FIGS. 5A-5D show a cap 50 according to the present invention with an apparatus 60 according to the present invention with an apparatus 70 according to the present invention. The apparatus 60 is like the apparatus of FIG. 3A (without the projections 34). The apparatus 70 has a connection member 71 (which may be a plastic or metal disc)

which is connected to the cap 50 and a support member 72 (which may be metal or plastic wire) which has a curved tip 73. The connection member 71 may be releasably or permanently connected to the cap 50 and, in one particular aspect, releasable connection is provided using RCHLF material (e.g. for connector structure 50a) on the cap 50 and RCHLF material 24 on the connection member 71.

Figure 5A:
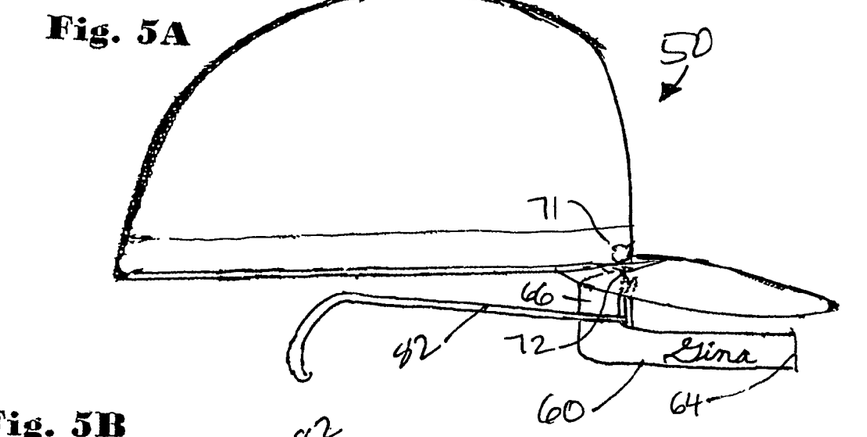
FIG. 5A is a side view of a cap according to the present invention with apparatus according to the present invention.
Figures 5B, 5C, 5E:
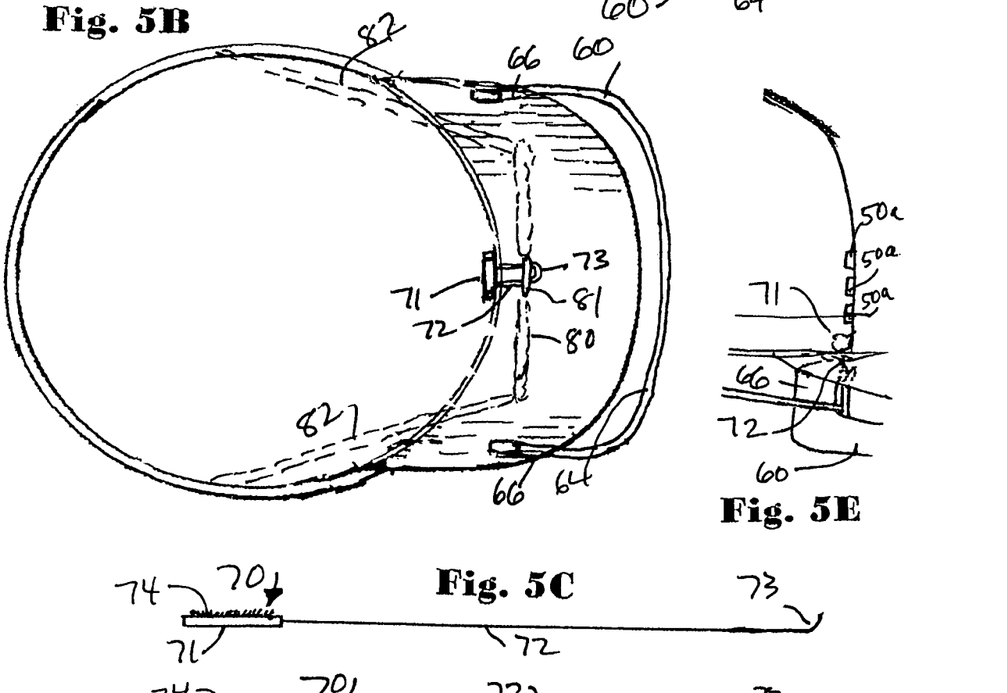
FIG. 5B is a top view partially in cross-section of the cap of FIG. 5B.
FIG. 5C is a side view of an apparatus according to the present invention.
FIG. 5E is a partial view of a cap as in FIG. 5A.
Figure 5D:
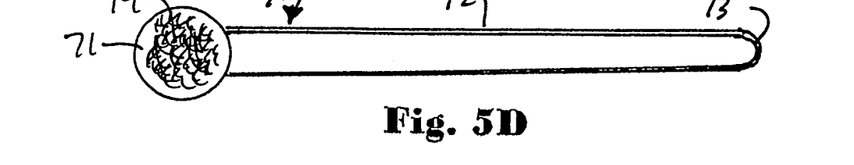
FIG. 5D is a top view of the apparatus of FIG. 5C.

As shown in FIGS. 5A and 5B the support member 72 contacts a bridge piece 81 of eyeglasses 80 and the curved tip 73 curves under the bridge piece 81. The support member 72 (and the support member of the device of FIG. 6A) may be made of stainless steel or other suitable plastic or metal material. The apparatus 60 is attached to the cap 50 as are the apparatuses of FIGS. 2A or 3B. FIG. 5E shows a cap as in FIG. 5A (like numerals indicate like parts) with a plurality of spaced-apart connection structures 50a on the cap's interior to provide adjustability for connecting the support member 72 to the cap. Any suitable connector or connecting structure may be used for the connection member 71 and the connection structures 50a, including, but not limited to, RCHLF material. Alternatively, the apparatus 60 may be positioned and configured so that no part of it is beneath the eyeglasses and the eyeglass lenses are not in front of the apparatus 60.

The apparatus 60 is sized, shaped and located as shown in FIGS. 5A and 5B so that side temple members 82 of the eye glasses 80 pass over a front member 64 of the apparatus 60 and, optionally, abut tabs 66 of the apparatus 60. As is the case with any apparatus according to the present invention, any desired logo, wording, indicia, and/or advertising, e.g. like (but not limited to) the word "Gina" on the apparatus 60, can be applied on an apparatus according to the present invention.

Figures 6A, 6B, 6C, 6D, 6E:
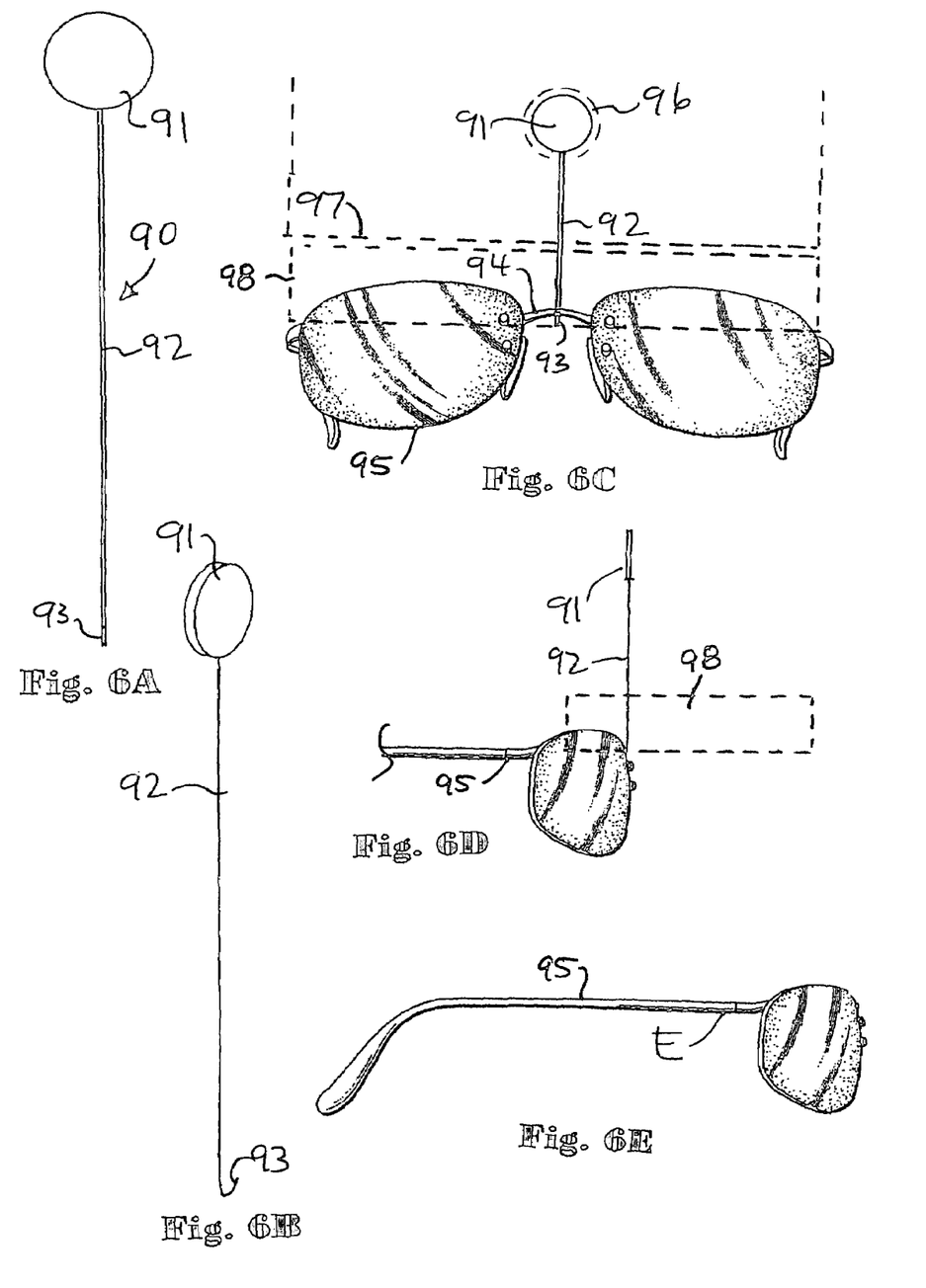
FIG. 6A is a front view of an apparatus according to the present invention.
FIG. 6B is a perspective view of the apparatus of FIG. 6A.
FIG. 6C is a front view of the apparatus of FIG. 6A with eyeglasses.
FIG. 6D is a side view of the apparatus of FIG. 6C.
FIG. 6E is a side view of apparatus according to the present invention.

When worn with eyeglasses, any of the apparatuses according to the present invention disclosed herein can be located and positioned on top of or near the top of the eyeglasses to provide a rain shield for the eyeglasses. As shown in FIG. 6E a pair of eyeglasses E has a shield S according to the present invention positioned to block rain, snow, drizzle, etc.

As shown in FIGS. 6A and 6B, a support 90 according to the present invention has a top connection member 91 (e.g., like that of the apparatus of FIG. 5C), a support member 92 connected to the top connection member 91, and a lower hook portion 93 for engaging part of a pair of eyeglasses.

FIGS. 6C and 6D show the support 90 releasably connected to a bridge part 94 of a pair of eyeglasses 95. The hook portion 93 has engaged the bridge part 94. The top connection member 91 is releasably connected to a connector 96 (shown schematically) which is part of a visor, cap, hat, eyeshade, headband, headgear etc. 97 (shown schematically). Any material and/or structure disclosed herein (and any suitable known connection apparatus, device, or structure) can be used for the connector 96 and top connection member 91.

Figure 7:
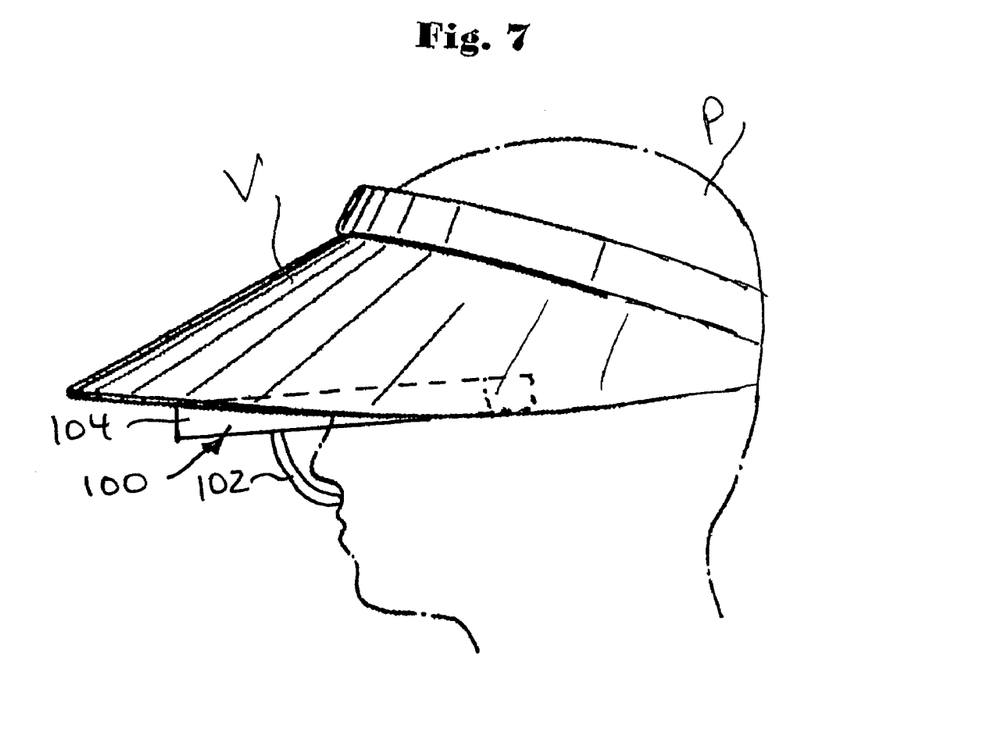
FIG. 7 is a side view of an apparatus according to the present invention.

FIG. 7 shows a visor V on a person P with a shield 100 (e.g. like the apparatuses 10, 30, 60 described above) according to the present invention. As may be the case with any apparatus according to the present invention, the shield 100 has, optionally, a lower part 102 projecting down from a main member 104. The lower part 102 is shaped and configured as a nose mask and covers the person's nostrils. In certain aspects the lower part 102 is either air-permeable or non-air-permeable.

Figures 8A, 8B:
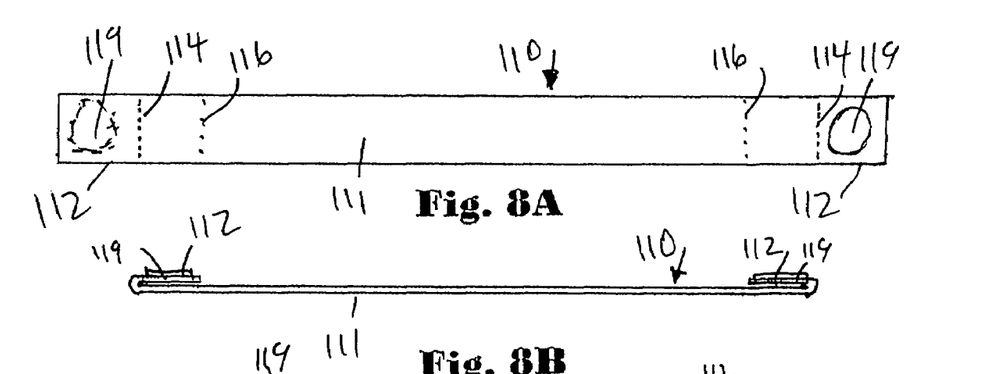
FIG. 8A is a front view of an apparatus according to the present invention.
FIG. 8B is a top view of an apparatus as in FIG. 8A with ends folded.
Figure 8C:
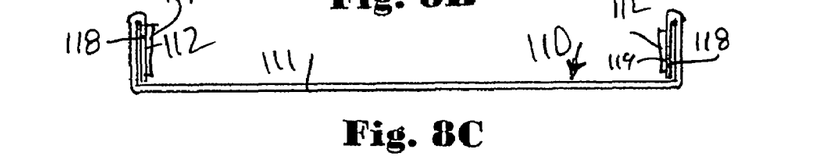
FIG. 8C is a top view of an apparatus as in FIG. 8A with ends folded.

FIGS. 8A-8C show a shield 110 according to the present invention which has a front member 111; ends 112; and creases or indentations 114, 116. As shown in FIGS. 8B and 8C, upon folding, the ends 112 have surfaces 118 which are located inwardly of the shield 110. Any known connector material and/or adhesive 119 may be used on the ends 112 to releasably connect the ends 112 to a person's temples or sides of a face; to a cap, hat, headband, etc; or to a pair of eyeglasses. Optionally an apparatus 98 (shown schematically; e.g. like the apparatuses 10, 30, and 60 described above) may be used with the support 90 and headgear 97 and, in one aspect, located with a front member in front of the eyeglasses 95.

The present invention, therefore, in at least some embodiments, provides a blocking apparatus for positioning in front of a person's face, the blocking apparatus including a front member disposable in front of a person's face, the front member having two spaced-apart ends, two tab members, each tab member projecting from one of the two spaced-apart ends of the front member, each tab member disposable at an angle to the front member and each tab member having means thereon for attachment of the front member to another item, and the front member sized and shaped for blocking a portion of a person's face. Such a blocking apparatus may have one or some (in any possible combination) of the following: wherein the person has a head, the blocking apparatus further includes the another item, the another item including apparatus for encompassing at least a portion of the person's head; wherein the another item is from the group consisting of hat, cap, sun visor, sunshade, eyeshade, and headband; wherein the front member is positionable to block light on a person's eyes; wherein the front member is positionable to block light on a person's field of vision; wherein the person wears eyeglasses and wherein the front member is positionable to block moisture from contacting a portion of the person's eyeglasses; wherein the person wears eyeglasses and wherein the front member is positionable to block moisture from contacting a portion of the person's eyes; wherein the another item is an item with a front bill and the tab members are releasably attachable to an underside of the front bill; the blocking apparatus including the another item, the another item including an item with a front bill and the tab members releasably attachable to an underside of the front bill; wherein the item with a front bill also has a cap part for covering part of a person's head, and the blocking apparatus further includes an eyeglasses support with a base secured to the cap part and a support member extending down from the base, the support member having an upturned end for engaging part of a person's eyeglasses to inhibit release of the eyeglasses from the person's head; wherein the eyeglasses support base is releasably secured to the cap part; wherein each tab member is releasably attachable to the another item; wherein the front member has a projecting member projecting therefrom to block an additional part of a person's face; wherein the projecting member is sized and configured for covering a person's nostrils; and/or wherein the projecting member permits the passage of air for a person to breathe.

The present invention, therefore, in at least some embodiments, provides a blocking apparatus for positioning in front of a person's face, the blocking apparatus including: a front member disposable in front of a person's face, the front member having two spaced-apart ends, two tab members, each tab member projecting from one of the two spaced-apart ends of the front member; each tab member disposable at an angle to the front member and each tab member having means thereon for attachment of the front member to another item; the front member sized and shaped for blocking a portion of a person's face; wherein the person has a head, the blocking apparatus including the another item, the another item including apparatus for encompassing at least a portion of the person's head; wherein the another item is from the group consisting of hat, cap, sun visor, sunshade, eyeshade, and headband; wherein the item with a front bill also has a cap part for covering part of a person's head, and the blocking apparatus including an eyeglasses support with a base secured to the cap part and a support member extending down from the base; the support member having an upturned end for engaging part of a person's eyeglasses to inhibit release of the eyeglasses from the person's head; and wherein the eyeglasses support base is releasably secured to the cap part.

The present invention, therefore, in at least some embodiments, provides an eyeglasses support for inhibiting release of eyeglasses from a position on a person's head, the eyeglasses support including an eyeglasses support with a base securable to another item and a support member extending down from the base, and the support member having an upturned end for engaging part of a person's eyeglasses to inhibit release of the eyeglasses from a person's head. Such an eyeglasses support may have one or some (in any possible combination) of the following: wherein the eyeglasses support base is releasably securable to a part of headgear; wherein the base has RCHLF material for releasable connecting a corresponding amount of RCHLF material on the another item; and/or wherein the support member is made of material from the group consisting of plastic or metal wire.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112.

What is claimed is:

1. A blocking apparatus for positioning in front of a person's face, the blocking apparatus comprising
    a front member disposable in front of a person's face, the front member having two spaced-apart ends, two tab members, each tab member projecting from one of the two spaced-apart ends of the front member,
    each tab member disposable at an angle to the front member and substantially parallel with the person's face, each tab member having attachment means thereon,
    the front member sized and shaped for blocking a portion of a person's face, and
    a lower part connected to and projecting down from the front member, the lower part sized and configured for covering nasal channels of the person's nostrils.

2. The blocking apparatus of claim 1 wherein the lower part is made of material from the group consisting of air-permeable material and non-air-permeable material.

3. The blocking apparatus of claim 1 wherein the person has a head, the blocking apparatus further comprising encompassing apparatus for encompassing at least a portion of the person's head, the attachment means attached to said encompassing apparatus.

4. The blocking apparatus of claim 1 wherein the encompassing apparatus is any of hat, cap, sun visor, eyeshade, and headband.

5. The blocking apparatus of claim 1 wherein the front member is positionable to block light on a person's eyes.

6. The blocking apparatus of claim 1 wherein the front member is positionable to block light in a person's field of vision.

7. The blocking apparatus of claim 1 further comprising the encompassing apparatus comprising an item with a front bill and the tab members releasably attachable to an underside of the front bill.

8. The blocking apparatus of claim 1 wherein the front member has a projecting member projecting therefrom to block an additional part of a person's face.

9. A blocking apparatus comprising
    a front member disposable in front of a person's face, the front member having two spaced-apart ends, two tab members, each tab member projecting from one of the two spaced-apart ends of the front member,
    each tab member disposable at an angle to the front member and each tab member having attachment means thereon,
    the front member sized and shaped for blocking a portion of a person's face,
    wherein the person has a head, the blocking apparatus further comprising encompassing apparatus for encompassing at least a portion of the person's head,
    wherein the encompassing apparatus is any of hat, cap, sun visor, eyeshade, and headband,
    the blocking apparatus further comprising
        an eyeglasses support with a base secured to the encompassing apparatus and a support member extending down from the base,
    the support member having a lower hook portion, the lower hook portion having a free open hook end projecting from the support member, the free open hook end for receiving therein part of a person's eyeglasses to releasably hold said part and to inhibit release of the eyeglasses from a person's head.

10. The blocking apparatus of claim 9 wherein the encompassing apparatus is any of hat, cap, sun visor, eyeshade, and headband.

11. The blocking apparatus of claim 9 wherein the front member is positionable to block light on a person's eyes.

12. The blocking apparatus of claim 9 wherein the front member is positionable to block light in a person's field of vision.

13. The blocking apparatus of claim 9 further comprising
    a lower part connected to and projecting down from the front member, the lower part sized and configured for covering nostrils of the person.

14. The blocking apparatus of claim 13 wherein the lower part is made of material from the group consisting of air-permeable material and non-air-permeable material.

15. An eyeglasses support for inhibiting release of eyeglasses from a position on a person's head, the eyeglasses support comprising
    an eyeglasses support with a base and a support member extending down from the base, and
    the support member having a lower hook portion,
    the lower hook portion having a free open hook end projecting from the support member, the lower hook portion' free open hook end for receiving therein part of a person's eyeglasses to releasably hold said part and to inhibit release of the eyeglasses from a person's head.

16. The eyeglasses support of claim 15 wherein the eyeglasses support base is releasably securable to a part of headgear.

17. The eyeglasses support of claim 15 wherein the base has an amount of releasably cooperating hook and loop fastener material.

18. The eyeglasses support of claim 15 wherein the support member is made of metal wire.

19. The eyeglasses support of claim 15 wherein the support member is made of plastic wire.

20. The eyeglasses support of claim 15 wherein the support member comprises two parallel wire parts with said free open hook end joining said two parallel wire members.

\* \* \* \* \*